United States Patent
Lipski

(10) Patent No.: US 7,669,915 B2
(45) Date of Patent: Mar. 2, 2010

(54) BREAKAWAY TRIM INTERFACE FOR DOOR LOCK KNOB

(75) Inventor: John G. Lipski, Macomb, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 19 days.

(21) Appl. No.: 12/178,690

(22) Filed: Jul. 24, 2008

(65) Prior Publication Data

US 2010/0019534 A1 Jan. 28, 2010

(51) Int. Cl.
  *B60R 13/02* (2006.01)
  *B60J 5/04* (2006.01)
(52) U.S. Cl. .................... 296/146.7; 296/1.08
(58) Field of Classification Search ............ 296/146.7, 296/1.08
  See application file for complete search history.

(56) References Cited

U.S. PATENT DOCUMENTS 5,794,995 A * 8/1998 Creesy et al. ............... 292/348
2003/0001364 A1 * 1/2003 Welch et al. .............. 280/730.2
2005/0052005 A1 * 3/2005 Lunt et al. ............... 280/730.2

\* cited by examiner

*Primary Examiner*—Dennis H Pedder
(74) *Attorney, Agent, or Firm*—Quinn Law Group, PLLC

(57) ABSTRACT

An interior trim arrangement for a motor vehicle door assembly is provided. The trim arrangement includes a trim panel with inner and outer portions connected by an upper portion that spans therebetween. The outer portion attaches the interior trim panel to the window belt line of the vehicle door assembly. A breakaway portion is integrated to the trim panel. The breakaway portion has an upper segment that extends orthogonally from an outer segment. The upper and outer segments are respectively elongated along the upper and outer portions of the trim panel. The outer segment is configured to attach the breakaway portion to the window belt line of the vehicle door assembly. The upper segment defines an aperture therethrough that is configured to receive the lock knob of the door lock assembly. The breakaway portion is configured to separate from the interior trim panel under a predetermined threshold lateral loading condition.

20 Claims, 2 Drawing Sheets

BREAKAWAY TRIM INTERFACE FOR DOOR LOCK KNOB

TECHNICAL FIELD

The present invention relates generally to door assemblies for motorized vehicles, and more specifically to interior trim interfaces for door lock knobs.

BACKGROUND OF THE INVENTION

Most conventional motorized vehicles, such as the modern-day automobile, are provided with lock mechanisms designed to prevent the various vehicle door assemblies from inadvertently opening, and to allow each door assembly to be selectively opened with a door handle for entry and egress. Many of these locks may be operated from the inside of the vehicle by manipulating a lock knob or button generally located along the window frame, often arranged at one end of the upper portion of a trim panel. There are a variety of additional ways to lock and unlock the vehicle door, including using a key, a power lock switch, a numeric key pad on the outside of the door, or by using a remote keyless system, such as "electronic key fobs" and "proximity sensor devices".

In a conventional vehicle door lock, a lock rod, which is normally a one-piece design, connects the lock button to the locking mechanism—e.g., a portion of the latch lever. Generally, when the lock knob is depressed, either manually or through an electro-mechanical interface, the door handle is operatively disconnected from the door latch, and the door is retained in a locked state even if the inside or outside door handle is actuated. When the lock knob is raised, thus shifting to an unlocked position, the door handles are reengaged with the door latch (e.g., through a pawl and latch interface), whereby the vehicle door becomes openable via manipulation of the door handles.

In many applications, the door lock assembly is mounted in an interior space between an outer door panel and an interior trim panel. A first end of the lock knob extends through a slot in the upper surface of the trim panel, whereas the second opposing end of the lock knob is spun onto a threaded proximal-end of the lock rod. Under certain loading conditions, the door trim panel may separate from the door inner panel in the lateral, cross-car direction. In so doing, the lock knob may be pulled from its intended location, inadvertently unlocking the door latch in the process.

SUMMARY OF THE INVENTION

According to one embodiment of the present invention, a trim arrangement for use with a vehicle door assembly is provided. The trim arrangement includes a trim panel with first and second portions connected by an intermediate portion that spans therebetween. The first portion is designed to attach the trim panel to the support structure of the vehicle door assembly. A breakaway portion is integrated with (e.g., formed in or attached to) the trim panel. The breakaway portion has first and second segments that are respectively oriented with respect to the first and intermediate portions of the trim panel. The first segment is configured to attach the breakaway portion to the inner support structure of the vehicle door assembly. The second segment defines an aperture therethrough that is configured to mate with the lock knob of the door lock assembly. The breakaway portion is configured to separate from the trim panel under a predetermined lateral loading condition. A trim arrangement according to the present design prevents inadvertent lock-state changes when the interior trim panel is unintentionally separated from the door structure.

In one aspect of this particular embodiment, the first segment of the breakaway portion extends generally orthogonally from one end of the second segment.

In another aspect of this embodiment, the breakaway portion is a breakaway insert that is configured to mate with and thereby attach to the trim panel. In this instance, the trim panel preferably defines a complementary slot that is configured to receive the breakaway insert such that the second segment is generally flush with the intermediate portion of the trim panel. For example, the second segment of the breakaway insert includes opposing first and second lips that define a recessed channel therebetween. In addition, the slot includes first and second notch portions respectively elongated along the first and intermediate portions of the trim panel. The first and second notch portions each have the same general contour as (e.g., are geometrically coextensive with) the first and second segments of the breakaway insert, respectively. The second notch portion is designed to slidably receive the second segment of the breakaway insert.

According to another aspect of this embodiment, the breakaway portion is a weakened region formed in the trim panel. The weakened region is configured to weaken the trim panel at preselected locations such that the trim panel tears away from the breakaway portion under a predetermined threshold lateral load. Desirably, the weakened region includes a reduced thickness portion that extends along the outer periphery of the breakaway portion.

In accordance with yet another aspect of this embodiment, the trim arrangement also includes a clip that is configured to mate with, and thereby secure the first segment of the breakaway portion to the inner support structure of the vehicle door assembly. Ideally, the clip includes first and second j-hook portions that are respectively configured to press-fit with the first segment of the breakaway portion and the support structure of the vehicle door assembly.

According to another embodiment of the present invention, an interior trim arrangement for a motor vehicle door assembly is provided. The door assembly has an inner support structure that defines a belt line of a window opening. A door lock assembly with a lock knob is located laterally inboard of the door's inner support structure. The trim arrangement includes an interior trim panel having an inner portion that is laterally inboard from, and connected to an opposing outer portion by an upper portion that spans therebetween. The outer portion is configured to attach the interior trim panel to the belt line of the vehicle door assembly.

A breakaway portion is integrated with the interior trim panel. The breakaway portion has an upper segment extending generally orthogonally from one end of an outer segment. The upper and outer segments of the breakaway portion are respectively elongated along the upper and outer portions of the interior trim panel. The outer segment is configured to attach the breakaway portion to the belt line of the vehicle door assembly, while the upper segment defines an aperture therethrough to receive and operatively locate the lock knob. The breakaway portion is configured to separate from the interior trim panel under a predetermined threshold lateral loading condition imparted to the interior trim arrangement.

According to one aspect of this embodiment, the breakaway portion is a breakaway insert that mates with, and releasably attaches to the trim panel. The upper segment of the breakaway insert includes opposing upper and lower lips that are in spaced parallel relation to one another, and define a recessed channel therebetween. The trim panel preferably includes a complementary slot that is configured to slidably receive the breakaway insert such that exterior surfaces of the upper and outer segments are substantially flush with respective exterior surfaces of the upper and outer portions of the trim panel. To this regard, the slot includes upper and outer notch portions respectively elongated along the upper and outer portions of the trim panel. Each of the notch portions is geometrically coextensive with a respective segment of the breakaway insert.

In another aspect, the breakaway portion is a weakened region formed in the trim panel. The weakened region is designed to weaken the trim panel at preselected locations such that the trim panel tears away from the breakaway portion under a predetermined threshold lateral load imparted to the interior trim panel. The weakened region includes, for example, a reduced thickness region that extends continuously about the outer periphery of the breakaway portion In accordance with yet another aspect, the trim arrangement includes a clip configured to mate with, and thereby secure the outer segment of the breakaway portion to the belt line of the vehicle door assembly. The clip preferably includes first and second j-hook portions that extend outward from opposing ends of an intermediate connection portion. The first j-hook portion is configured to press-fit with the outer segment of the breakaway portion, whereas the second j-hook portion is configured to press-fit with the inner support structure of the vehicle door assembly.

The above features and advantages, and other features and advantages of the present invention, will be readily apparent from the following detailed description of the preferred embodiments and best modes for carrying out the present invention when taken in connection with the accompanying drawings and appended claims.

DESCRIPTION OF THE PREFERRED EMBODIMENTS

Figure 1:
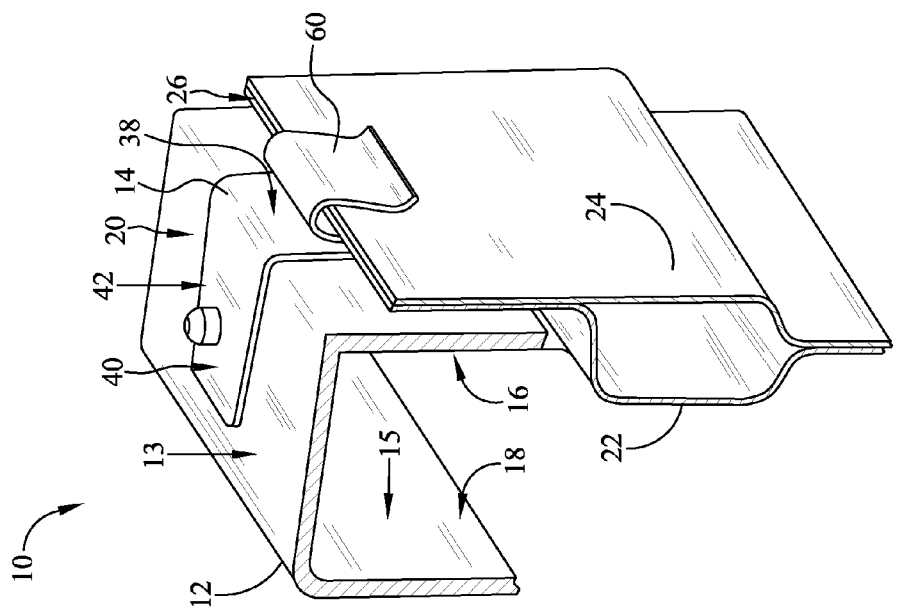
FIG. 1 is a partially cut-away perspective-view illustration of a breakaway trim interface for a door lock knob in accordance with one embodiment of the present invention.

Referring to the drawings, wherein like reference numbers refer to the same or similar components throughout the several views, FIG. 1 is a partially cut-away, perspective-view illustration of a portion of an interior trim arrangement, identified generally as 10, in accordance with one embodiment of the present invention. The various trim arrangements discussed herein are intended for integration into the passenger compartment of a conventional automobile (not specifically illustrated herein). It should be recognized, however, that the present invention may be integrated into any motor vehicle application, such as buses, trains, airplanes, etc., without departing from the intended scope of the present invention. In addition, the drawings presented herein are not to scale and are provided purely for instructional purposes. Thus, the specific and relative dimensions shown in the drawings are not to be considered limiting. Finally, the use of certain adjectives, such as "inner", "outer", "upper", "lower", "inboard", or "outboard", are intended to specify the comparative orientation of a given component relative to the vehicle when operatively mounted thereto.

Figure 2:
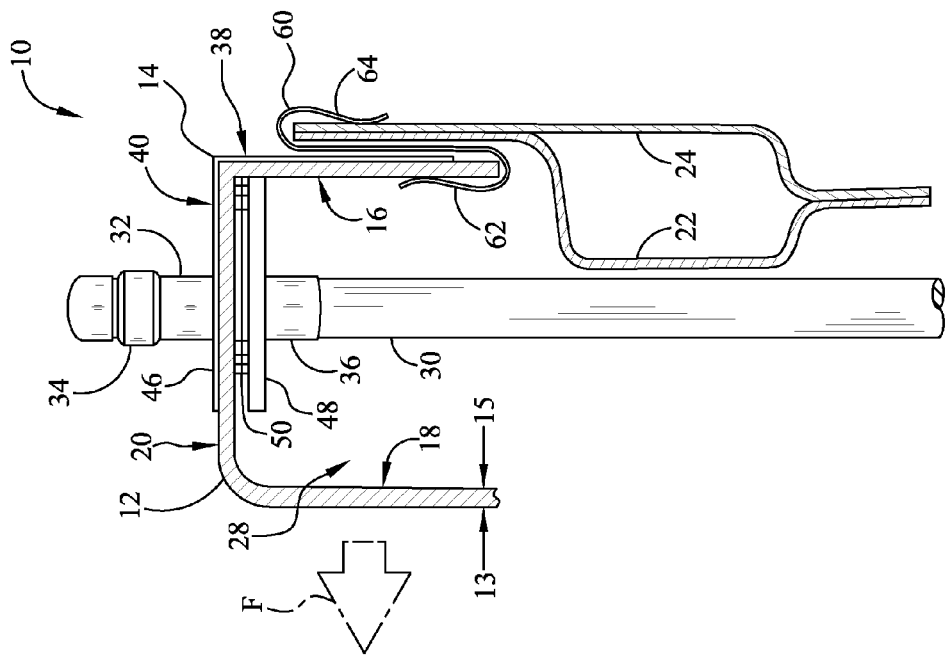
FIG. 2 is side-view illustration in partial cross-section of the breakaway trim interface of FIG. 1.
Figure 3:
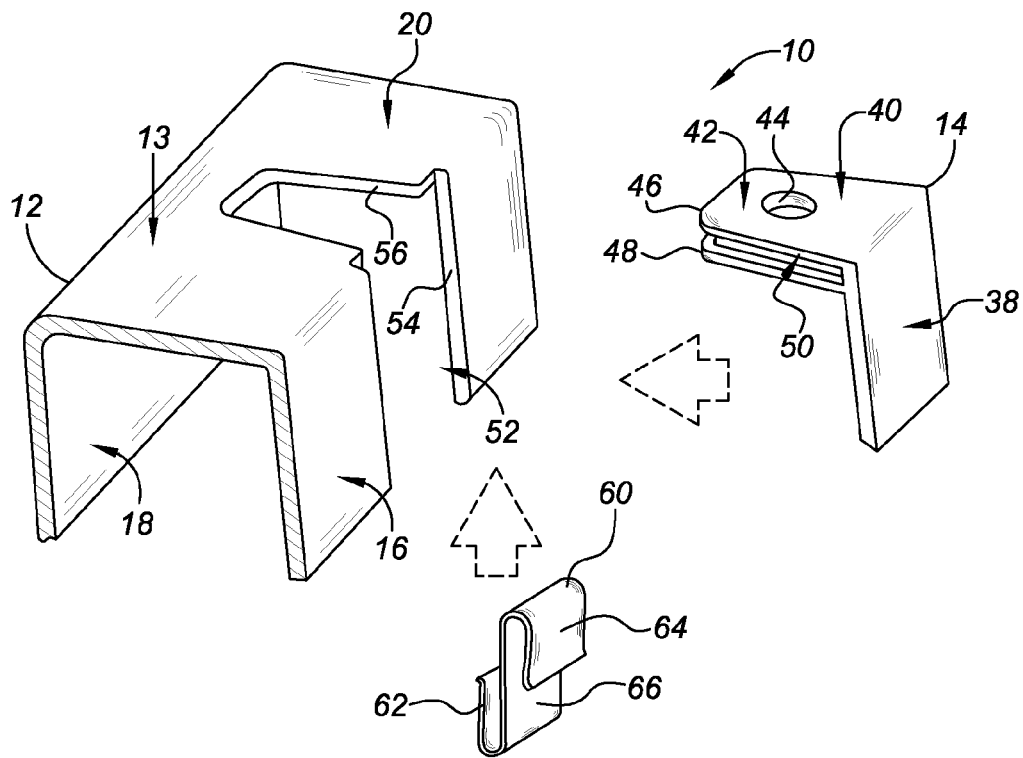
FIG. 3 is an exploded perspective-view illustration of the breakaway trim interface of FIGS. 1 and 2.

With reference to FIGS. 1-3, the trim arrangement 10 of the present invention includes two primary components: an interior trim panel 12 and a breakaway portion 14 that is integrated thereto. The trim panel 12 has a first, outer portion 16 that is generally parallel to and laterally outboard from a second, inner portion 18. Respective upper ends of the outer and inner portions 16, 18 are connected by an intermediate, upper portion 20 that spans therebetween. The trim panel 12 also has an exterior or "A-side" surface 13 in opposing relation to an interior or "B-side" surface 15. The trim panel 12 is preferably fabricated from a material typical for trim panels. For example, the interior trim panel 12 may be formed from a plastic composite that is covered by a foam material or padding (not shown), which in turn may be concealed by a decorative cloth, leather, or vinyl.

The outer portion 16 of the trim panel 12 is configured to attach to the inner support structure of a vehicle door assembly by any conventional means, such as clips, fasteners, heat stakes, etc. The inner support structure, which is represented by inner and outer door panels 22 and 24, respectively, cooperate to define, at least in part, the belt line of a window opening 26. The inner and outer door panels 22, 24 are part of the load bearing structure of the door assembly. As such, each door panel 22, 24 is preferably manufactured (e.g., punched, pressed, hydroformed, etc.) from a material known to have a suitable strength for the intended use of the vehicle door assembly, such as, but certainly not limited to, a rigid plastic polymer (e.g., Polymethyl methacrylate or PMMA, or bulk mold compound or BMC), a metallic material (e.g., cold rolled steel, hot dipped galvanized steel, stainless steel, aluminum, and the like), or a combination thereof, which may be finished with an anti-corrosive, highly durable coating (e.g., zinc plating).

Looking at FIG. 2, the trim panel 12 and door inner support structure 22, 24 cooperate to create an interior space or compartment 28 that houses or conceals, among other things, a door lock assembly. The door lock assembly is represented herein by a lock rod 30 that connects a lock button 32 to a door locking mechanism (not visible in the views provided), all of which are preferably located laterally inboard from the inner door panel 22. As seen in FIG. 2, a first end 34 of the lock knob 32 extends through the exterior surface 13 of the trim panel 12, whereas a second opposing end 36 of the lock knob 32 is spun onto a threaded proximal-end of the lock rod 30.

In the embodiment of FIGS. 1-3, the breakaway portion consists of a breakaway insert 14, which is a separate and distinct component from the interior trim panel 12 (as best seen in FIG. 3). The breakaway insert 14 has a first, outer segment 38 with a second, upper segment 40 that extends generally orthogonally from one end thereof. The outer segment 40 is configured, as will be described below with respect to a representative example, to securely attach the breakaway insert 14 to the inner support structure—i.e., inner and outer door panels 22, 24, of the vehicle door assembly. The upper segment 40, on the other hand, defines an aperture 44 therethrough that is dimensioned and oriented to receive and operatively locate the lock knob 32 of the door lock assembly. The breakaway insert 14 preferably consists of a single-piece, generally L-shaped rigid member. It should also be recognized, however, that the structural characteristics of the breakaway insert 14—e.g., the individual and relative orientations, dimensions, materials, and shapes of the first and second segments 38, 40, may be modified to suit the needs of a particular application without departing from the intended scope of the claimed invention.

With reference to FIGS. 2 and 3, the upper segment 40 of the breakaway insert 14 includes generally flat, opposing upper and lower lips 46 and 48, respectively, that are in spaced parallel relation to one another. The upper and lower lips 46, 48 are separated by a recessed channel 50 (FIG. 2) that extends continuously along the fore, inner and aft sides of the upper segment 40. The trim panel 12 includes a complementary slot 52 that is configured to slidably receive the breakaway insert 14 such that the exterior surface 42 of the breakaway insert 14 is substantially flush with the exterior surface 13 of the trim panel 12. To this regard, the slot 52 is composed of a first, outer notch portion 54 that is elongated along the outer portion 16 of the trim panel 12, and a second, upper notch portion 56 that is elongated along the upper portion 20 of the trim panel 12, extending generally perpendicular from the outer notch portion 54.

The breakaway insert 14 mates with, and thereby releasably attaches to the trim panel 12. For example, as seen in FIG. 2, the first and second notch portions 54, 56 each have the same general contour as (e.g., are geometrically coextensive with) the first and second segments 38, 40 of the breakaway insert 14, respectively. Moreover, the second notch portion 56 is designed to slidably receive the second segment 40 of the breakaway insert 14. Accordingly, when the breakaway insert 14 is pressed, fed, or fitted into the slot 52 such that the channel 50 abuts against the inner periphery of the upper notch portion 56, placing the upper and lower lips 46, 48 immediately adjacent to the exterior and interior surfaces 13, 15 of the trim panel 12, respectively, the outer and upper segments 38, 40 of the breakaway insert 14 are respectively elongated along the outer and upper portions 16, 20 of the interior trim panel 12 in a generally flush-fit manner.

The interior trim arrangement 10 also includes one or more clips 60 that are designed to mate with, and thereby secure the outer segment 38 of the breakaway insert 14 to the window belt line 26 of the vehicle door assembly, as shown in FIGS. 1 and 2. The clip 60 preferably includes first and second j-hook portions 62 and 64, respectively, that extend outward in opposite directions from opposing ends of an intermediate connection portion 66. The first j-hook portion 62 is configured to press-fit onto the outer segment 38 of the breakaway insert 14, whereas the second j-hook portion 64 is configured to press-fit onto the inner support structure—i.e., inner and outer door panels 22, 24, of the vehicle door assembly.

The breakaway insert 14 is configured to separate from the interior trim panel 12 under a predetermined threshold lateral loading condition that is imparted to the interior trim arrangement 10, represented for illustration purposes by phantom arrow F in FIG. 2. For example, when the trim panel 12 is unintentionally detached or pulled from the door inner support structure, the breakaway insert 14 will disconnect from the trim panel 12 and remain secured to the belt line of the window opening 26 via the clip 60. A trim arrangement according to the present design prevents inadvertent lock-state changes when the interior trim panel 12 is unintentionally separated from the vehicle door structure.

Figure 4:
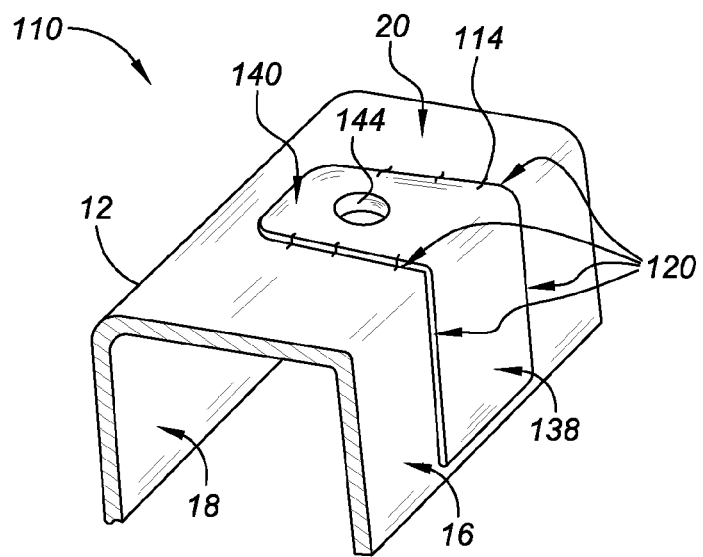
FIG. 4 is a partially cut-away perspective-view illustration of a breakaway trim interface for a door lock knob in accordance with another embodiment of the present invention.

FIG. 4 of the drawings provides a partially cut-away, perspective-view illustration of a breakaway trim interface 110 for a door lock knob (e.g., lock knob 32 of FIG. 2) in accordance with another embodiment of the present invention. In this particular embodiment, the breakaway portion 114 is a weakened region that is formed in the trim panel 12. In other words, the trim panel 12 and breakaway portion 114 are a preformed, single-piece, unitary structure. Similar to the embodiment of FIGS. 1-3, the breakaway portion 114 of FIG. 4 has a first, outer segment 138 with a second, upper segment 140 that extends generally orthogonally from one end thereof. The outer segment 138 is configured to securely attach the breakaway insert 114 to the inner support structure (i.e., inner and outer door panels 22, 24 of FIG. 1) of the vehicle door assembly (e.g., via clip 60 of FIG. 3). The upper segment 140 defines an aperture 144 therethrough that is dimensioned and oriented to receive and operatively locate the lock knob 32 of the door lock assembly.

The weakened region 114 is designed to weaken the trim panel 12 at preselected locations such that the trim panel 12 tears away or detaches from the breakaway portion 114 under a predetermined threshold lateral load (e.g., lateral load F illustrated in FIG. 3) imparted to the interior trim panel 12. The weakened region includes, for example, a reduced thickness region 120 that extends continuously about the outer periphery of the breakaway portion 114. The reduced thickness region 120 acts as a tear seam which will split once subjected to a predetermined tensile load. It is by this means that the breakaway portion 114 will disconnect from the trim panel 12 and remain secured to the belt line of the window opening 26 when the trim panel 12 is unintentionally detached or pulled from the door inner support structure.

While the best modes for carrying out the present invention have been described in detail, those familiar with the art to which this invention relates will recognize various alternative designs and embodiments for practicing the invention within the scope of the appended claims.

The invention claimed is:

1. A trim arrangement for use with a vehicle door assembly having a support structure and a door lock assembly with a lock knob, the trim arrangement comprising:
   a trim panel with a first portion connected to a second portion by an intermediate portion spanning therebetween, said first portion configured to attach said trim panel to the support structure of the vehicle door assembly; and
   a breakaway portion integrated with said trim panel, said breakaway portion having a first segment and a second segment respectively oriented with respect to said first and intermediate portions of said trim panel, said first segment configured to attach said breakaway portion to the support structure of the vehicle door assembly, and said second segment defining an aperture therethrough configured to operatively mate with the lock knob;
   wherein said breakaway portion is configured to separate from said trim panel under a predetermined lateral loading condition.

2. The trim arrangement of claim 1, wherein said first segment of said breakaway portion extends generally orthogonally from one end of said second segment.

3. The trim arrangement of claim 1, wherein said breakaway portion is a breakaway insert configured to mate with and attach to said trim panel.

4. The trim arrangement of claim 3, wherein said trim panel defines a complementary slot configured to receive said breakaway insert such that said second segment is generally flush with said intermediate portion of said trim panel.

5. The trim arrangement of claim 3, wherein said second segment of said breakaway insert includes opposing first and second lips defining a recessed channel therebetween.

6. The trim arrangement of claim 5, wherein said trim panel defines a slot including first and second notch portions respectively elongated along said first and intermediate portions of said trim panel, said first and second notch portions having the same general contour as respective said first and second segments of said breakaway insert.

7. The trim arrangement of claim 6, wherein said second notch portion is configured to slidably receive said second segment of said breakaway insert.

8. The trim arrangement of claim 1, wherein said breakaway portion is a weakened region formed in said trim panel and configured to weaken said trim panel at preselected locations such that said trim panel tears away from said breakaway portion under a predetermined threshold lateral load.

9. The trim arrangement of claim 8, wherein said weakened region includes a reduced thickness portion extending along a substantial portion of the outer periphery of said breakaway portion.

10. The trim arrangement of claim 1, further comprising:
a clip configured to mate with and thereby secure said first segment of said breakaway portion to the inner support structure of the vehicle door assembly.

11. The trim arrangement of claim 10, wherein said clip includes first and second j-hook portions respectively configured to press-fit with said first segment of said breakaway portion and the support structure of the vehicle door assembly.

12. An interior trim arrangement for a motor vehicle door assembly having an inner support structure at least partially defining a belt line of a window opening, and a door lock assembly with a lock knob located laterally inboard of the door inner support structure relative to the vehicle, the trim arrangement comprising:
an interior trim panel with an inner portion connected to an outer portion by an upper portion spanning therebetween, said outer portion configured to attach said interior trim panel to the belt line of the vehicle door assembly; and
a breakaway portion integrated with said trim panel, said breakaway portion having an upper segment extending generally orthogonally from one end of an outer segment, said upper and outer segments respectively elongated along said upper and outer portions of said trim panel, said outer segment configured to attach said breakaway portion to the belt line of the vehicle door assembly, and said upper segment defining an aperture therethrough configured to receive and operatively locate the lock knob;
wherein said breakaway portion is configured to separate from said interior trim panel under a predetermined threshold lateral loading condition imparted to the interior trim arrangement.

13. The interior trim arrangement of claim 12, wherein said breakaway portion is a breakaway insert configured to mate with and releasably attach to said trim panel.

14. The interior trim arrangement of claim 13, wherein said upper segment of said breakaway insert includes opposing upper and lower lips in spaced parallel relation to one another and defining a recessed channel therebetween.

15. The interior trim arrangement of claim 14, wherein said trim panel defines a complementary slot configured to slidably receive said breakaway insert such that exterior surfaces of said upper and outer segments are substantially flush with respective exterior surfaces of said upper and outer portions of said trim panel.

16. The interior trim arrangement of claim 15, wherein said slot includes upper and outer notch portions respectively elongated along said upper and outer portions of said trim panel, said upper and outer notch portions being geometrically coextensive with respective said upper and outer segments of said breakaway insert.

17. The interior trim arrangement of claim 12, wherein said breakaway portion is a weakened region formed in said trim panel and configured to weaken said trim panel at preselected locations such that said trim panel tears away from said breakaway portion under a predetermined threshold lateral load imparted to said interior trim panel.

18. The interior trim arrangement of claim 17, wherein said weakened region includes a reduced thickness extending continuously about the outer periphery of said breakaway portion.

19. The interior trim arrangement of claim 12, further comprising:
a clip configured to mate with and thereby secure said outer segment of said breakaway portion to the belt line of the vehicle door assembly.

20. The trim arrangement of claim 19, wherein said clip includes first and second j-hook portions extending from opposing ends of a connection portion, said first j-hook portion configured to press-fit with said outer segment of said breakaway portion, and said second j-hook portion configured to press-fit with the inner support structure of the vehicle door assembly.

* * * * *